(12) United States Patent
Chen et al.

(10) Patent No.: US 9,344,204 B2
(45) Date of Patent: May 17, 2016

(54) METHOD, APPARATUS, AND COMPUTER PROGRAM PRODUCT FOR ADAPTIVE RELAYING DATA DISTRIBUTION IN WIRELESS NETWORKS

(75) Inventors: Canfeng Chen, Beijing (CN); Jia Liu, Beijing (CN); Yongguang Guo, Beijing (CN); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 121 days.

(21) Appl. No.: 14/381,688

(22) PCT Filed: Apr. 5, 2012

(86) PCT No.: PCT/CN2012/073532
§ 371 (c)(1),
(2), (4) Date: Aug. 28, 2014

(87) PCT Pub. No.: WO2013/149383
PCT Pub. Date: Oct. 10, 2013

(65) Prior Publication Data
US 2015/0049665 A1 Feb. 19, 2015

(51) Int. Cl.
*H04H 20/08* (2008.01)
*H04H 20/71* (2008.01)
*H04W 40/22* (2009.01)

(52) U.S. Cl.
CPC .............. *H04H 20/08* (2013.01); *H04H 20/71* (2013.01); *H04W 40/22* (2013.01)

(58) Field of Classification Search
USPC ........................................................ 370/315
See application file for complete search history.

(56) References Cited

U.S. PATENT DOCUMENTS

| | | | | |
|---|---|---|---|---|
| 2009/0323579 A1* | 12/2009 | Bai | ........................ | H04W 40/08 370/315 |
| 2010/0306319 A1* | 12/2010 | Brzozowski | .............. | G06F 8/65 709/206 |
| 2012/0230246 A1* | 9/2012 | Ishihara | ................ | G06F 1/3209 370/315 |
| 2016/0007316 A1* | 1/2016 | Vaidya | ................ | H04W 64/003 370/312 |

OTHER PUBLICATIONS

International Search Report for International Application No. PCT/CN2012/073532 mailed Jan. 10, 2013.

* cited by examiner

*Primary Examiner* — Andrew Lai
*Assistant Examiner* — Jamaal Henson
(74) *Attorney, Agent, or Firm* — Locke Lord LLP (57) ABSTRACT

Method, apparatus, and computer program product example embodiments enable data distribution in wireless communication networks. In example embodiments, a method comprises receiving a wireless broadcast message including a message ID and an associated distributor address; buffering the received wireless broadcast message and starting an observation window timer for the message if the message ID of the received wireless broadcast message is not stored in a database of message IDs and associated distributor addresses for previously received wireless broadcast messages; calculating a relaying probability for the received wireless broadcast message, based on a number of distributor address entries associated with the message ID in the database, the entries resulting from receiving other wireless broadcast messages having the same message ID during the observation window; transmitting the buffered message following termination of the observation window, based on the calculated relaying probability; and starting a cooling window timer upon termination of the observation window and removing all records containing the message ID from the database following termination of the cooling window.

18 Claims, 11 Drawing Sheets

INFORMATION CLEANING PROCESS

METHOD, APPARATUS, AND COMPUTER PROGRAM PRODUCT FOR ADAPTIVE RELAYING DATA DISTRIBUTION IN WIRELESS NETWORKS

FIELD

The field of the invention relates to wireless communication and more particularly to data distribution in wireless communication networks.

BACKGROUND

Modern society has adopted, and is becoming reliant upon, wireless communication devices for various purposes, such as connecting users of the wireless communication devices with other users. Wireless communication devices may vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

The field of the invention relates to wireless communication and more particularly to data distribution in wireless communication networks.

According to an example embodiment of the invention, a method comprises:

receiving a wireless broadcast message including a message ID and an associated distributor address;

buffering the received wireless broadcast message and starting an observation window timer for the message if the message ID of the received wireless broadcast message is not stored in a database of message IDs and associated distributor addresses for previously received wireless broadcast messages;

calculating a relaying probability for the received wireless broadcast message, based on a number of distributor address entries associated with the message ID in the database, the entries resulting from receiving other wireless broadcast messages having the same message ID during the observation window;

transmitting the buffered message following termination of the observation window, based on the calculated relaying probability; and starting a cooling window timer upon termination of the observation window and removing all records containing the message ID from the database following termination of the cooling window.

According to an example embodiment of the invention, a method comprises:

scheduling the transmitting the received wireless broadcast message, if the relaying probability is not less than a random number.

According to an example embodiment of the invention, a method comprises:

calculating the relaying probability based on the number of distributor address entries associated with the message ID in the database and a value derived from measured signal strengths of the received wireless broadcast messages; and scheduling the transmitting the received wireless broadcast message, if the relaying probability is not less than a random number.

According to an example embodiment of the invention, a method comprises:

wherein the observation window has a random duration.

According to an example embodiment of the invention, a method comprises:

wherein the cooling window is at least twice a duration of the observation window.

According to an example embodiment of the invention, a method comprises:

ignoring any further wireless broadcast messages having the same message ID during the cooling window.

According to an example embodiment of the invention, an apparatus comprises:

at least one processor;

at least one memory including computer program code;

the at least one memory and the computer program code configured to, with the at least one processor, cause the apparatus at least to:

receive a wireless broadcast message including a message ID and an associated distributor address;

buffer the received wireless broadcast message and start an observation window timer for the message if the message ID of the received wireless broadcast message is not stored in a database of message IDs and associated distributor addresses for previously received wireless broadcast messages;

calculate a relaying probability for the received wireless broadcast message, based on a number of distributor address entries associated with the message ID in the database, the entries resulting from receiving other wireless broadcast messages having the same message ID during the observation window;

transmit the buffered message following termination of the observation window, based on the calculated relaying probability; and start a cooling window timer upon termination of the observation window and remove all records containing the message ID from the database following termination of the cooling window.

According to an example embodiment of the invention, an apparatus comprises:

the at least one memory and the computer program code configured to, with the at least one processor, cause the apparatus at least to:

schedule the transmitting the received wireless broadcast message, if the relaying probability is not less than a random number.

According to an example embodiment of the invention, an apparatus comprises:

the at least one memory and the computer program code configured to, with the at least one processor, cause the apparatus at least to:

calculate the relaying probability based on the number of distributor address entries associated with the message ID in the database and a value derived from measured signal strengths of the received wireless broadcast messages; and schedule the transmitting the received wireless broadcast message, if the relaying probability is not less than a random number.

According to an example embodiment of the invention, an apparatus comprises:

wherein the observation window has a random duration.

According to an example embodiment of the invention, an apparatus comprises:

wherein the cooling window is at least twice a duration of the observation window.

According to an example embodiment of the invention, an apparatus comprises:

the at least one memory and the computer program code configured to, with the at least one processor, cause the apparatus at least to:

ignore any further wireless broadcast messages having the same message ID during the cooling window.

According to an example embodiment of the invention, a computer program product comprises computer executable program code recorded on a computer readable non-transitory storage medium, the computer executable program code comprising:

code for receiving a wireless broadcast message including a message ID and an associated distributor address;

code for buffering the received wireless broadcast message and starting an observation window timer for the message if the message ID of the received wireless broadcast message is not stored in a database of message IDs and associated distributor addresses for previously received wireless broadcast messages;

code for calculating a relaying probability for the received wireless broadcast message, based on a number of distributor address entries associated with the message ID in the database, the entries resulting from receiving other wireless broadcast messages having the same message ID during the observation window;

code for transmitting the buffered message following termination of the observation window, based on the calculated relaying probability; and code for starting a cooling window timer upon termination of the observation window and removing all records containing the message ID from the database following termination of the cooling window.

According to an example embodiment of the invention, a computer program product comprises:

code for scheduling the transmitting the received wireless broadcast message, if the relaying probability is not less than a random number.

According to an example embodiment of the invention, a computer program product comprises:

code for calculating the relaying probability based on the number of distributor address entries associated with the mes-sage ID in the database and a value derived from measured signal strengths of the received wireless broadcast messages; and code for scheduling the transmitting the received wireless broadcast message, if the relaying probability is not less than a random number.

According to an example embodiment of the invention, a computer program product comprises:

wherein the observation window has a random duration.

According to an example embodiment of the invention, a computer program product comprises:

wherein the cooling window is at least twice a duration of the observation window.

According to an example embodiment of the invention, a computer program product comprises:

code for ignoring any further wireless broadcast messages having the same message ID during the cooling window.

Accordingly, wireless communication devices perform data distribution in wireless communication networks, in an improved manner.

DISCUSSION OF EXAMPLE EMBODIMENTS OF THE INVENTION

In an example embodiment of the invention, wireless devices that send or relay broadcast messages are referred to herein as distributors and wireless devices that receive that broadcast messages are referred to herein as collectors. In an example embodiment of the invention, distributors employ adaptive relaying data distribution of wireless broadcast messages including a message ID and an associated distributor address.

A message in data distribution is the entity of information that is carried by one or multiple packets. Each message, despite the size, is allocated a unique identification that is sent along with the packets of that message. A node will find an unknown message when detecting an unknown identification in received packets, otherwise, the content of packet will be treated as belonging to a known message.

The sources of a data distribution belong to the category of distributors. Any other node, whenever it receives an unknown broadcasting message, has to decide whether to become a distributor for that message. The decision will be made according to the observed broadcasting situation for each node in the networks.

In accordance with an example embodiment of the invention, a new probabilistic auto-relaying method is provided for data distribution in wireless networks. It utilizes observable network information, such as the number of adjacent nodes that are broadcasting the same data, to calculate the probability of relaying that data. An example embodiment of the invention adaptively capitalizes on the changes of network conditions in terms of topology or density. An example embodiment of the invention does not necessarily involve any parameter setting, adjustment or any other intervention from users, while greatly reducing the transmission redundancy.

In an example embodiment of the invention, a collector device may scan the medium for wireless messages. The collector device may buffer one or more received wireless broadcast messages including a message ID and an associated distributor address if the message ID of the one or more received wireless broadcast messages is not in a record of a relaying database of message IDs and associated distributor addresses for previously received wireless broadcast messages. The collector device may also start an observation window timer if the message ID of the one or more received wireless broadcast messages is not in a record of a relaying database.

In an example embodiment of the invention, the collector device may store the message ID and associated distributor address of the one or more received wireless broadcast messages in a record of the relaying database, if a wireless broadcast message including the message ID or including both the message ID and the associated distributor address, is received during the observation window.

In an example embodiment of the invention, the collector device may update the relaying probability and the distributor addresses, along with the signal strengths, if it receives one or more messages the IDs of which are in a record of a relaying database.

In an example embodiment of the invention, the devices act as collector devices whenever they are not transmitting messages. A collector device receives a message and acts as per the rules described herein and decides whether to become a distributor device for a message, on a per message basis. Even if a device is a distributor device for a message with a first message ID, the device needs to remain as a collector for receiving other messages. Each device may act as collector whenever it is in a state in which it may receive messages.

In an example embodiment of the invention, the collector device is converted to a distributor device and, as a distributor device, may transmit the one or more received wireless broadcast messages following termination of the observation window, based on a number of associated distributor addresses with the message ID, which are in records of the relaying database.

In an example embodiment of the invention, the collector device may determine the number of associated distributor addresses with the message ID, which are in records of the relaying database, calculate a relaying probability based on the determined number of associated distributor addresses with the message ID, determine whether to become a distributor for that message if the relaying probability is not less than a random number, and schedule the transmitting the one or more received wireless broadcast messages if the device has become a distributor device.

In another example embodiment of the invention, the collector device may calculate a relaying probability based on the determined number of associated distributor addresses with the message ID and a value derived from measured signal strengths of distributors of the received wireless broadcast messages.

Figure 1A:
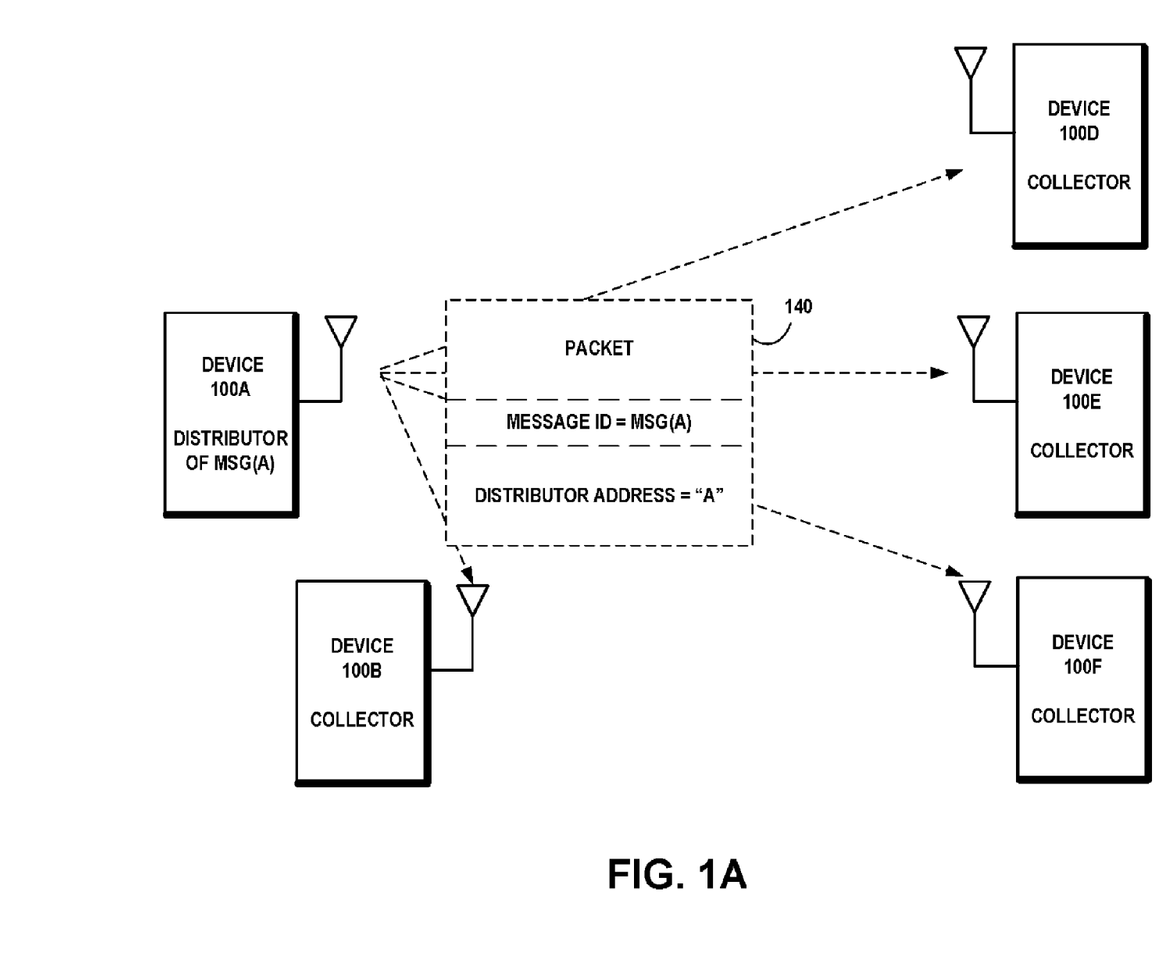
FIG. 1A is an example embodiment of a wireless network including five wireless devices, one device acting as a first distributor device is shown broadcasting a first wireless broadcast message that is received by the four other devices acting as collector devices because they are they are not currently transmitting messages, in accordance with an example embodiment of the invention.

FIG. 1A is an example embodiment of a wireless network including five wireless devices 100A, 100B, 100D, 100E, and 100F. One device 100A acting as a first distributor device, is shown broadcasting a first wireless broadcast message MSG (A) 140 that is received by the four other devices 100B, 100D, 100E, and 100F acting as collector devices because they are they are not currently transmitting messages, in accordance with an example embodiment of the invention. The first wireless broadcast message MSG(A) 140 includes a message ID="MSG(A)" and a distributor address "A" that is the address of distributor device 100A. Various types of content may be included in the received first wireless broadcast message 140, including documents, drawings, photographs, video files, music files, and the like.

In an example embodiment of the invention, each collector device 100B, 100D, 100E, and 100F may scan the wireless medium. If the collector device 100E receives one or more received wireless broadcast messages 140, it buffers the messages in a holding buffer. The collector device 100E starts an observation window timer 135 if the message ID of the one or more received wireless broadcast messages is not in a record of a relaying database of message IDs and associated distributor addresses for previously received wireless broadcast messages.

Figure 1B:
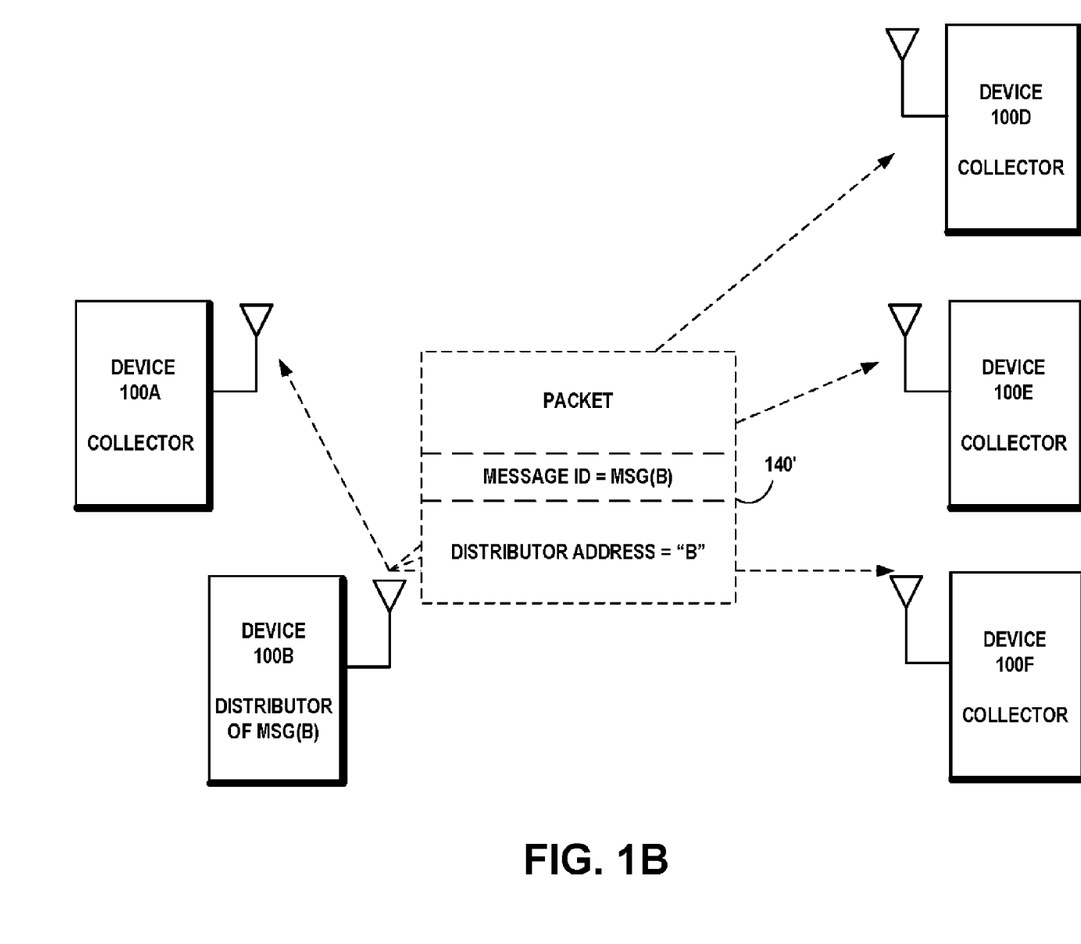
FIG. 1B is an example embodiment of the wireless network of FIG. 1A, wherein the first distributor device of FIG. 1A is no longer broadcasting a message and has therefore returned to the state of being a collector device and one of the four collector devices in FIG. 1A is now shown broadcasting a different, second wireless broadcast message and has therefore transitioned to the state of being a second distributor device broadcasting the second message that is received by the four other devices acting as collector devices, in accordance with an example embodiment of the invention.

FIG. 1B is an example embodiment of the wireless network of FIG. 1A, wherein the first distributor device 100A of FIG. 1A is no longer broadcasting a message and has therefore returned to the state of being a collector device and one of the four collector devices 100B in FIG. 1A is now shown broadcasting a different, second wireless broadcast message MSG (B) 140' and has therefore transitioned to the state of being a second distributor device broadcasting the second message MSG(B) 140' that is received by the four other devices 100A, 100D, 100E, and 100F acting as collector devices, in accordance with an example embodiment of the invention.

Figure 1C:
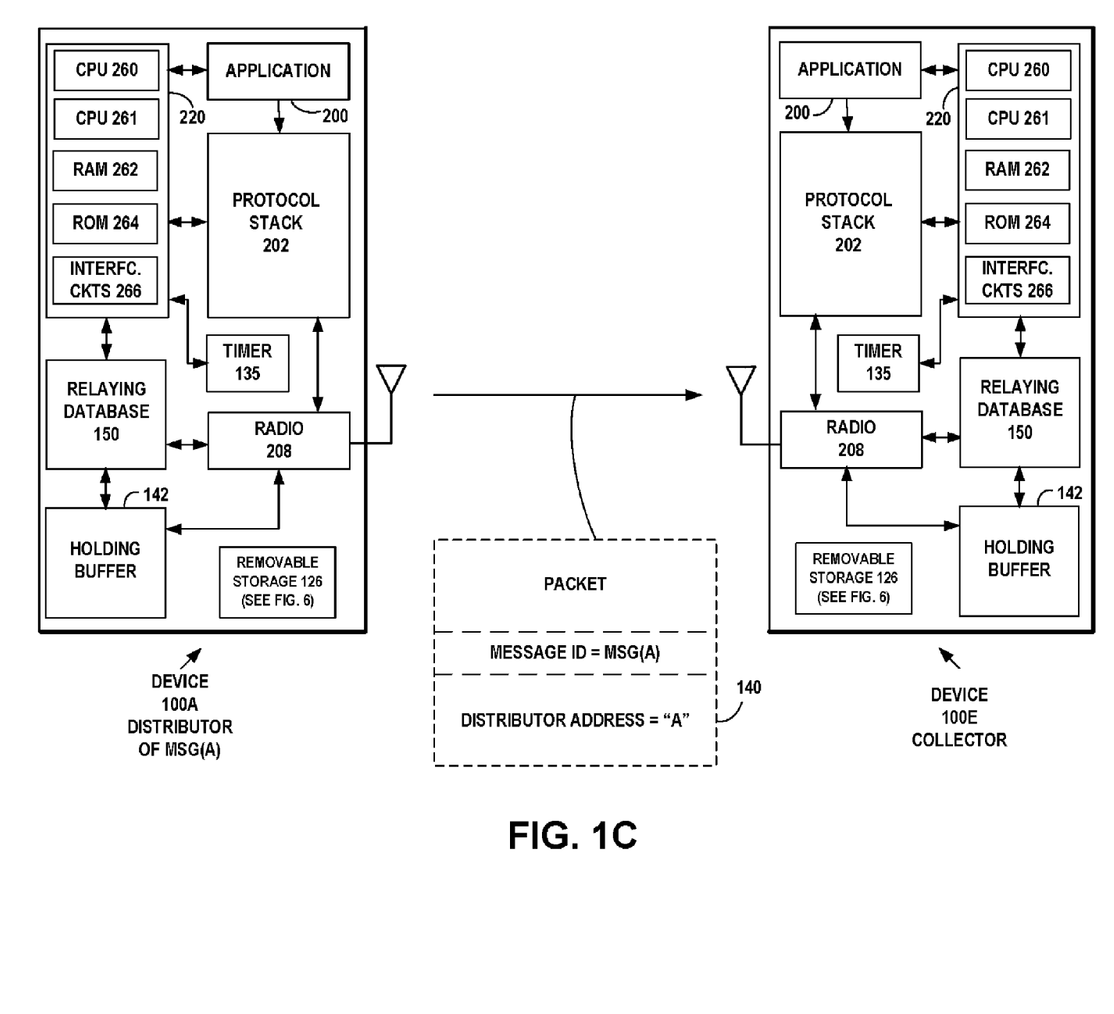
FIG. 1C is an example embodiment of the internal architecture of the first distributor device and an example collector device, where the first distributor device transmits the first wireless broadcast message to the example collector device, which buffers the received first wireless broadcast message and starts an observation window timer if the message ID of the received first wireless broadcast message is not stored in a database of message IDs and associated distributor addresses for previously received wireless broadcast messages, the example collector device also storing the message ID and associated distributor address of the received first wireless broadcast messages in a record of the database, during the observation window, in accordance with an example embodiment of the invention.

FIG. 1C is an example embodiment of the internal architecture of the first distributor device 100A broadcasting the first wireless broadcast message MSG(A) 140 and an example collector device 100E of FIG. 1A. The first distributor device 100A transmits the first wireless broadcast message MSG(A) to the example collector device 100E that buffers the received first wireless broadcast message in the holding buffer 142 and starts an observation window timer 135, if the message ID MSG(A) of the received first wireless broadcast message 140 is not stored in a relaying database 150 of message IDs and associated distributor addresses for previously received wireless broadcast messages. The example collector device 100E also stores the message ID MSG(A) and associated distributor address "A" of the received first wireless broadcast message 140 in a record of the relaying database 150, during the observation window, in accordance with an example embodiment of the invention.

The first distributor device 100A and the example collector device 100E may be a communications device, PDA, cell phone, laptop or palmtop computer, or the like or it may be a stationary access point, automotive dashboard interface, home electronics interface or other stationary interface or device. The first distributor device and the example collector device may be a remote controller, healthcare monitor, sports sensor, token, key fob, watch, wireless keyboard, gaming pad, body sensor, toy, health care equipment, human interface device, entertainment device, wireless microphone, GPS sensor, or the like.

The first distributor device 100A and the example collector device 100E may include a processor 220, which includes a dual core central processing unit (CPU) 260 and 261, a random access memory (RAM) 262, a read only memory (ROM) 264, and interface circuits 266 to interface with the radio transceiver 208. The first distributor device and the example collector device may each further include a battery and other power sources, key pad, touch screen, display, microphone, speakers, ear pieces, camera or other imaging devices, etc. The RAM 262 and ROM 264 may be removable memory devices such as smart cards, SIMs, WIMs, semiconductor memories such as RAM, ROM, PROMS, flash memory devices, etc. according to an embodiment of the present invention. According to an embodiment, the first distributor device and the example collector device each include the communications protocol stack 202.

Figure 6:
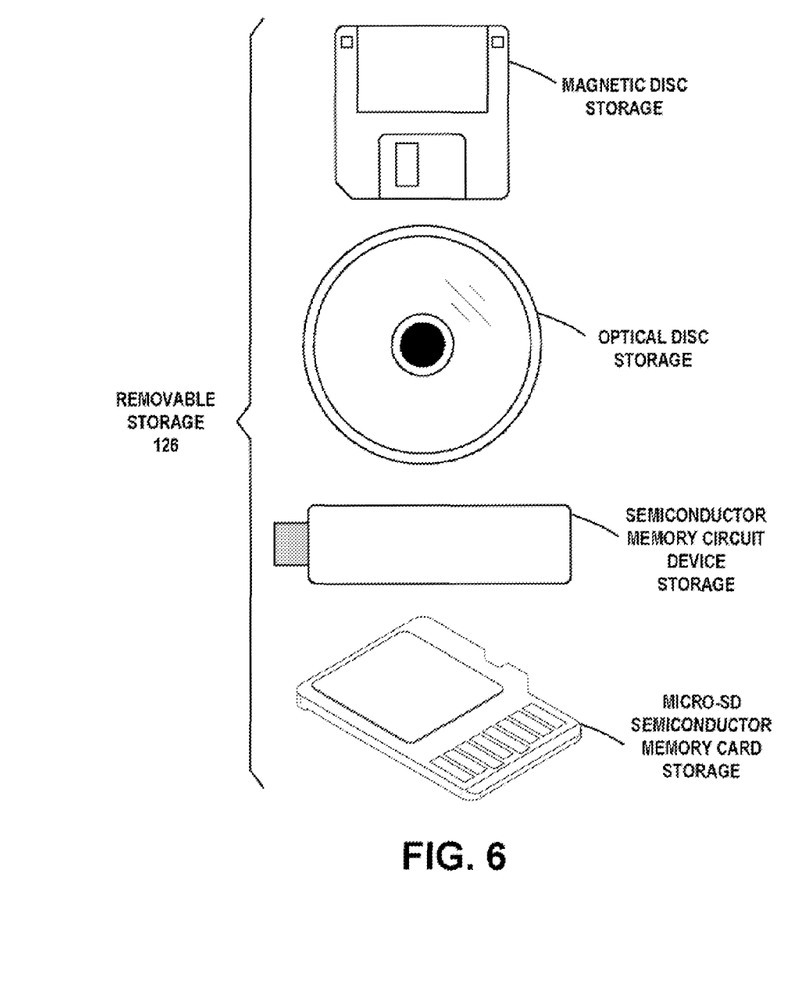
FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

The processor 220, protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the first distributor device and the example collector device from a computer program product or article of manufacture in the form of computer-usable media such as resident memory devices, smart cards or other removable memory devices, as illustrated in FIG. 6. Alternately, they may be embodied as integrated circuit logic in the form of programmed logic arrays or custom designed application specific integrated circuits (ASIC). The radio 208 in the each of the first distributor device and the example collector device may be separate transceiver circuits or alternately, the radio 208 may be a single radio module capable of handling one or multiple channels in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the first distributor device and the second collector device for execution of the program code for example by the CPUs 260 and/or 261. Removable storage media 126 are shown in FIG. 6.

In accordance with an example embodiment of the invention, the processor 220 in the collector device 100E, executing computer program code accessed from the RAM 262 and/or ROM 264, cause the collector device 100E at least to:

receive one or more wireless broadcast messages 140 including a message ID MSG(A) and an associated distributor address "A";

buffer the one or more received wireless broadcast messages in holding buffer 142 and start an observation window timer 135 if the message ID MSG(A) of the one or more received wireless broadcast messages is not stored in relaying database 150 of message IDs and associated distributor addresses for previously received wireless broadcast messages;

store the message ID MSG(A) and associated distributor address "A" of the one or more received wireless broadcast messages 140 in a record of the database 150, during the observation window;

calculate in the processor 220 a relaying probability for the one or more received wireless broadcast messages 140, based on a number of distributor address entries associated with the message ID MSG(A) in the database 150, the entries resulting from receiving other wireless broadcast messages having the same message ID MSG(A);

transmit with the radio 208 the one or more buffered messages 140 following termination of the observation window, based on the calculated relaying probability; and start a cooling window timer 135 upon termination of the observation window and remove all records containing the message ID from the database 150 following termination of the cooling window.

In accordance with an example embodiment of the invention, the processor 220 in the collector device 100E, executing computer program code accessed from the RAM 262 and/or ROM 264, cause the collector device 100E at least to ignore any further wireless broadcast messages having the same message ID during the cooling window.

In an example embodiment of the invention, the first distributor device 100A and the example collector device 100E may be any of a variety of wireless personal area, wireless local area, or wireless wide area radio devices, such as Land Mobile Radio, Professional Mobile Radio, DECT (Digital Enhanced Cordless Telecommunications), 1G, 2G, 3G, 4G Cellular systems, IrDA, RFID (Radio Frequency Identification), Wireless USB, DSRC (Dedicated Short Range Communications), Near Field Communication, wireless sensor networks, ZigBee, EnOcean; Bluetooth, TransferJet, Ultra-wideband (UWB from WiMedia Alliance), WLAN, IEEE 802.11, WiFi, HiperLAN, Wireless Metropolitan Area Networks (WMAN) and Broadband Fixed Access (BWA) (LMDS, WiMAX, AIDAAS and HiperMAN), or the like.

Figure 1D:
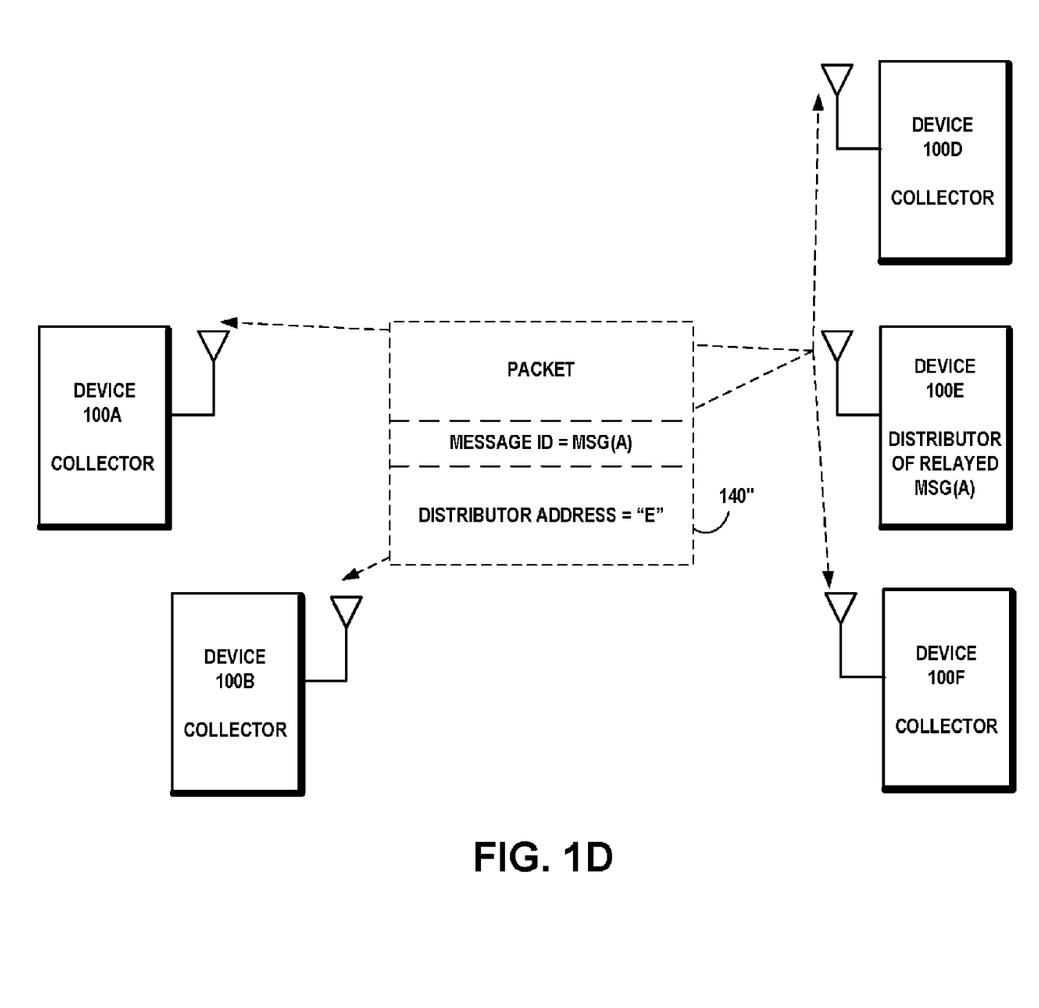
FIG. 1D is an example embodiment of the wireless network of FIG. 1A, wherein the example collector device calculates a relaying probability for the received first wireless broadcast message, based on a number of distributor address entries associated with the message ID in the database, the entries resulting from receiving other wireless broadcast messages having the same message ID, the example collector device adaptively transitioning to the state of being a distributor device, to relay the first wireless broadcast message received from the first distributor device, by scheduling the transmitting of the received first wireless broadcast message, if the relaying probability is not less than a random number, in accordance with an example embodiment of the invention.

FIG. 1D is an example embodiment of the wireless network of FIG. 1A, wherein the example collector device 100E of FIG. 1A, calculates a relaying probability for the received first wireless broadcast message 140, based on a number of distributor address entries associated with the message ID in the database 150, the entries resulting from receiving other wireless broadcast messages having the same message ID MSG(A). The example collector device 100E adaptively transitions to the state of being a distributor device, to relay the first wireless broadcast message 140" that was received as message 140 from the first distributor device 100A of FIG. 1A, by scheduling the transmitting of the received first wireless broadcast message 140", if the relaying probability is not less than a random number, in accordance with an example embodiment of the invention. Note that the relayed copy 140" of the first wireless broadcast message in FIG. 1D, has the distributor address="E" that is the address of the device 100E in its current state as a distributor device.

In an example embodiment of the invention, any collector device 100A, 100B, 100D, 100E, and 100F may become a candidate distributor device, just as did its original distributor, based on a number of associated distributor addresses with the message ID, which are in records of the relaying database 150.

In an embodiment of the invention, the example collector device 100E may calculate a relaying probability based on the determined number of associated distributor addresses with the message ID and schedule the transmitting the one or more received wireless broadcast messages from the holding buffer 142, if the relaying probability is not less than a random number. In an embodiment of the invention, the second collector device 100E may calculate a relaying probability based on the determined number of associated distributor addresses with the message ID and a value derived from measured signal strengths of the received wireless broadcast messages 140.

Figure 2:
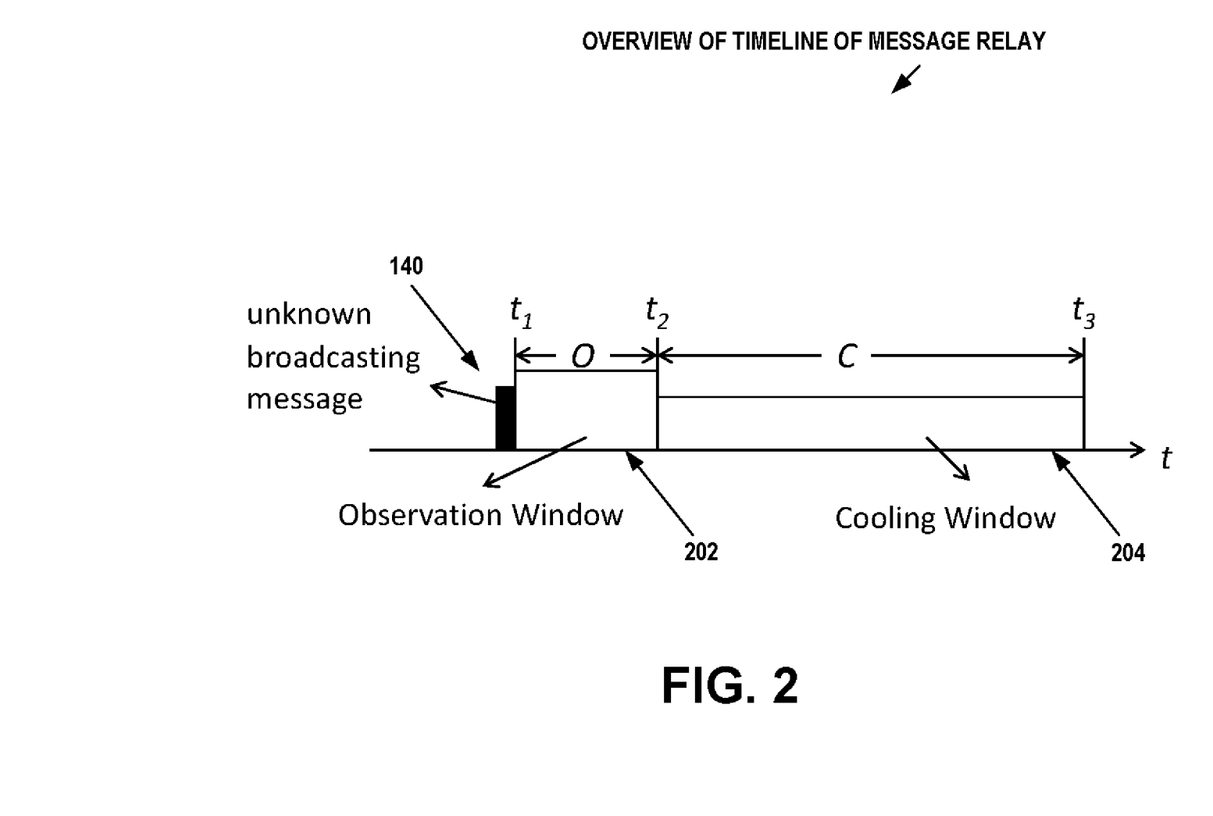
FIG. 2 illustrates an example overview of timeline of message relay, in accordance with an example embodiment of the invention.

FIG. 2 illustrates an example overview of timeline of message relay, in accordance with an example embodiment of the invention. As shown in FIG. 2, whenever an unknown broadcasting message 140 is detected by a node (at t1), two windows, an observation window "O" 202 and a cooling window "C" 204, will be followed.

The observation window 202 has random length, used for the node to observe the broadcasting situation of that message. The random length is particularly important since it makes the relaying decision in different nodes out of sync, so that some of the nodes may have chances to observe other distributors before they calculate the relaying probability, and in this way, to reduce the overlay redundancy. The upper bound of the observation window 202 may be differently selected based on concrete network in terms of multiple access way (e.g. CDMA or CSMA) and protocol parameters (e.g. frame length, priority scheduling, etc.).

Different from the observation window 202, the cooling window 204 has fixed length, and is usually set larger than twice of the upper bound of the observation window 202. The reason of setting up a cooling window 204 here is that, since message information will constantly accumulate in local storage space for each node, it is necessary to remove it once it becomes outdated; however, it cannot be removed as soon as the relaying decision is made (at t2), otherwise once the message is later relayed by others, it will be received as an unknown message, and possibly be relayed again. This is known as the Ping-Pong effect in broadcasting. A cooling window 204 will keep the message information of for a long enough time (until t3) to adequately cool down the repeated broadcasting thus successfully eliminate the Ping-Ping effect.

In an example embodiment of the invention, during the observation window 202, the collector device 100E may update the relaying probability and the distributor addresses, along with the signal strengths, if it receives one or more messages 140, the IDs of which are in a record of the relaying database 150.

In an example embodiment of the invention, the collector device 100E may ignore any further wireless broadcast messages having the same message ID during the cooling window.

Figure 3:
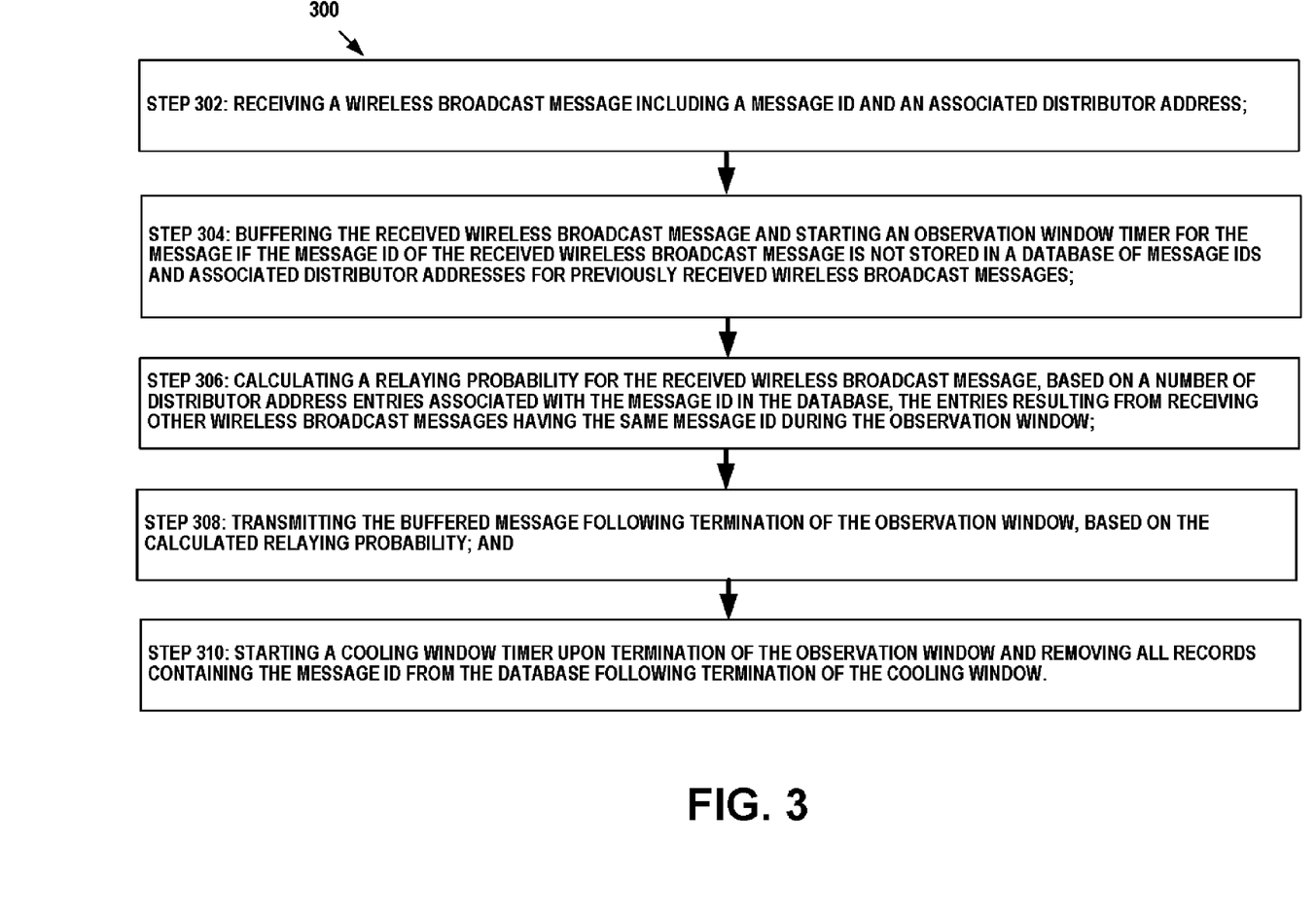
FIG. 3 illustrates an example flowchart of an example operation of the collector device, in accordance with an example embodiment of the invention.

FIG. 3 illustrates an example flowchart 300 of an example operation of the collector device, in accordance with an example embodiment of the invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 302: receiving a wireless broadcast message including a message ID and an associated distributor address;

Step 304: buffering the received wireless broadcast message and starting an observation window timer for the message if the message ID of the received wireless broadcast message is not stored in a database of message IDs and associated distributor addresses for previously received wireless broadcast messages;

Step 306: calculating a relaying probability for the received wireless broadcast message, based on a number of distributor address entries associated with the message ID in the database, the entries resulting from receiving other wireless broadcast messages having the same message ID during the observation window;

Step 308: transmitting the buffered message following termination of the observation window, based on the calculated relaying probability; and Step 310: starting a cooling window timer upon termination of the observation window and removing all records containing the message ID from the database following termination of the cooling window.

Figure 4A:
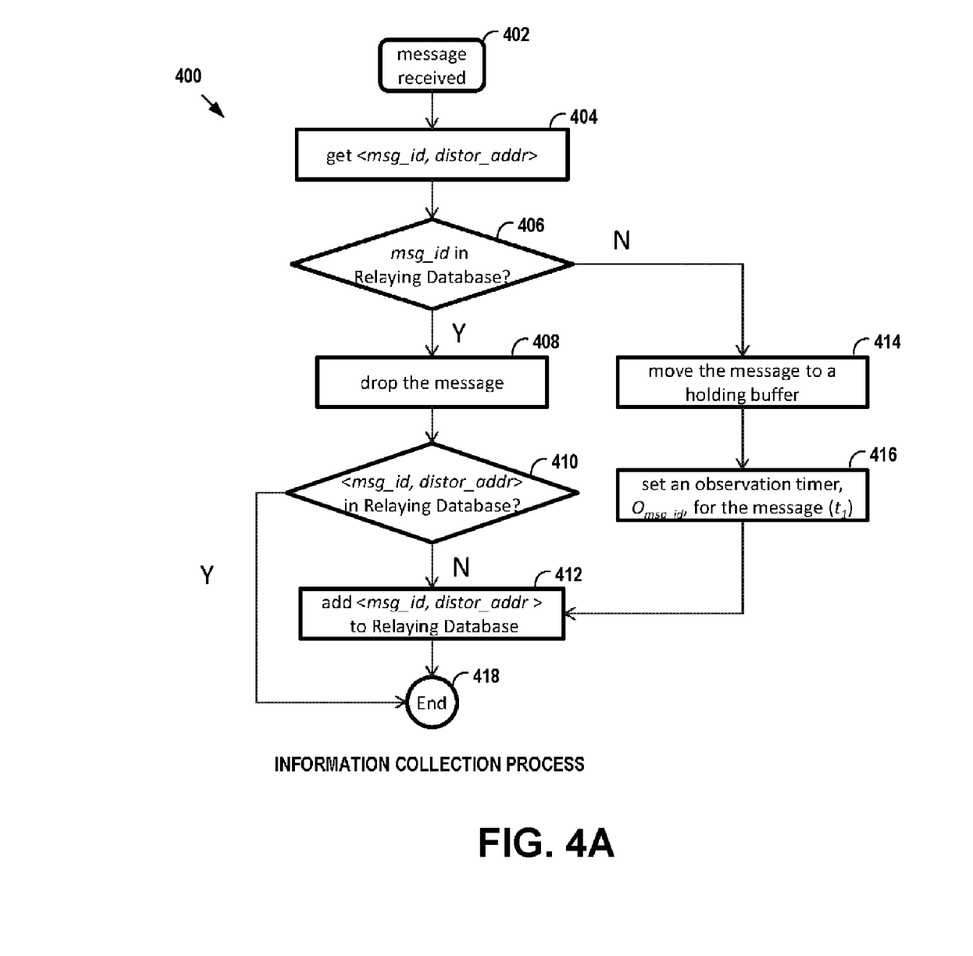
FIG. 4A illustrates another example flowchart of an example operation of the information collection process, in accordance with an example embodiment of the invention.

FIG. 4A illustrates an example flowchart 400 of an example operation of the information collection process, in accordance with an example embodiment of the invention.

On each node, once a broadcasting packet has been received in step 402 and handled (e.g. defragment, up-layer notification, etc.), the node will enter into an information collection process, which is shown in FIG. 4A.

First of all, in step 404, the message identification (msg_id) and distributor address (distor_addr) are retrieved.

Then in step 406, the msg_id will be searched in a local Relaying Database.

If not found, which means an unknown message is detected, the node will temporally keep the packet in a buffer in step 414, for future relaying.

After that, the node will set up an observation timer Omsg_id in step 416, (c.f. the time point t1 in FIG. 2).

Then the node will add the pair <msg_id, distor_addr> to the Relaying Database in step 412.

Otherwise, if the msg_id is found in the Relaying Database in step 406, this means the packet belongs to the known message.

The node drops the message in step 408.

The node will examine whether the distor_addr has already been kept in the Relaying Database in step 410.

If the answer is No, the pair <msg_id, distor_addr> will be added to the Relaying Database in step 412.

If the answer is Yes, just do nothing in step 418.

Figure 4B:
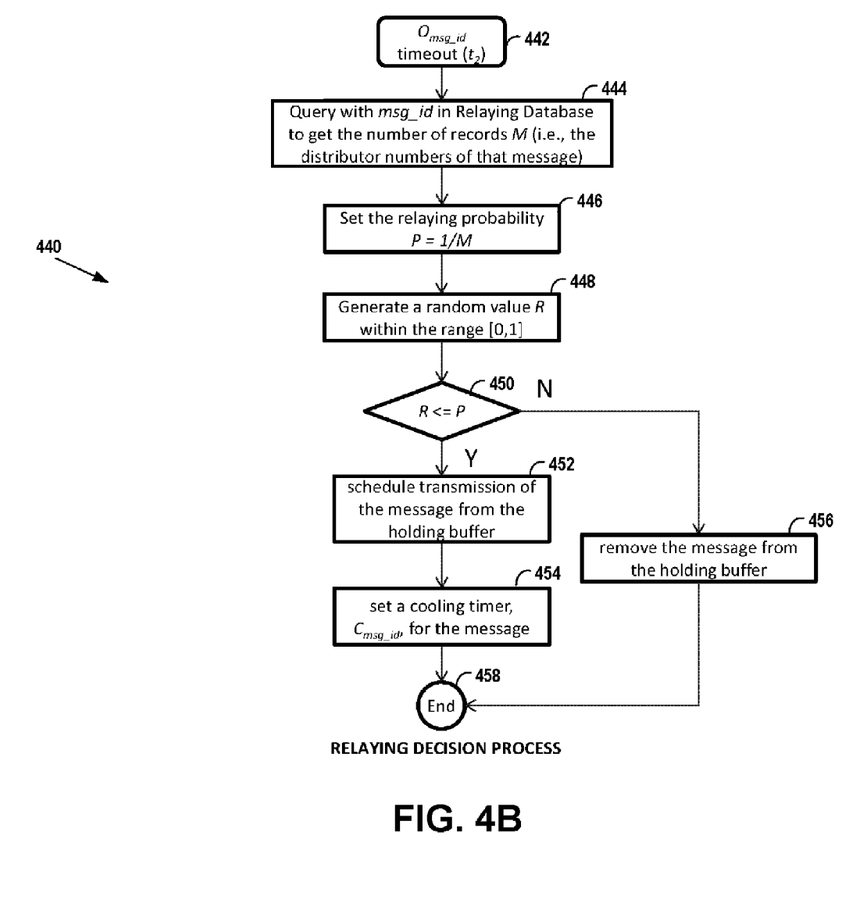
FIG. 4B illustrates an example flowchart of an example operation of the relaying decision process, in accordance with an example embodiment of the invention.

FIG. 4B illustrates an example flowchart 440 of an example operation of the relaying decision process, in accordance with an example embodiment of the invention.

At the time point of t2, i.e., the timeout event of an observation window timer in step 442, the node will enter a relaying decision process, as shown in FIG. 4B.

First, get the distributor number of the message, M (M>=1) at step 444. Calculate the relaying probability P=1/M in step 446.

Then generate a random value R within the range from 0 to 1 in step 448. Compare R with P in step 450.

If R<=P, the node becomes a distributor and schedules transmission of all the packets of that message in the buffer in step 452.

The node then starts cooling timer, Cmsg_id, for the message in step 454.

The node may ignore any further wireless broadcast messages having the same message ID during the cooling window.

Otherwise, the node becomes a collector and removes all the packets of the message from the buffer in step 456.

The process ends at step 458.

It should be pointed out that the concrete calculation the relaying probability P may be devised flexibly, a simple choice is P=1/M, but other choices such as P=1/2^(M−1) or P=1/log(10*M) are also applicable, based on the needs of the specific application. For example, in dense networks when devices have a lot of neighbors, the formula P=1/2^(M−1) which bears a sharp decreasing curve may be adopted, so as to avoid generation of more transmissions. Moreover, additional parameters such as radio signal strength might also be utilized during the relaying decision process. For example, if the signal strength from all the observed distributors is very weak, which means this node is located far from all the current distributors, it should as a result raise its probability for relaying.

Figure 4C:
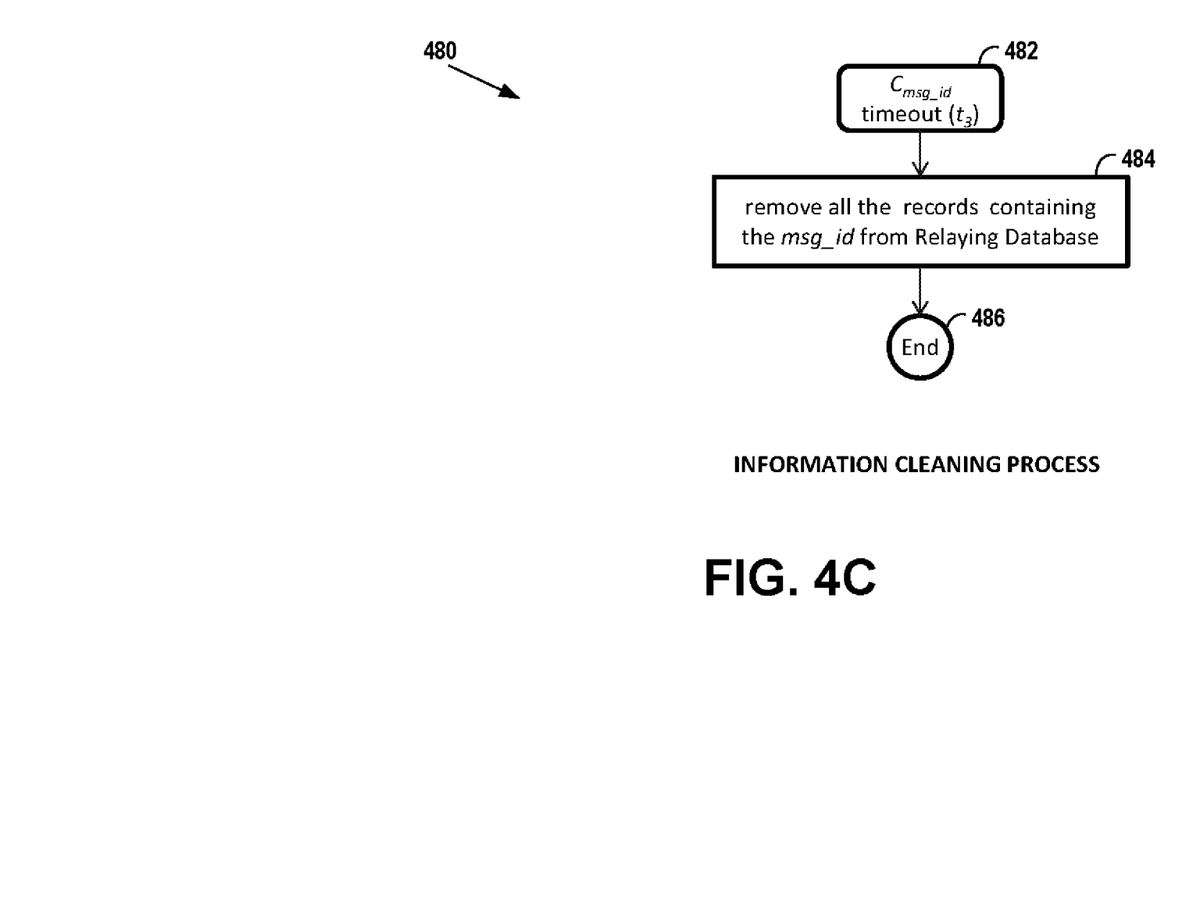
FIG. 4C illustrates an example flowchart of an example operation of the information cleaning process, in accordance with an example embodiment of the invention.

FIG. 4C illustrates an example flowchart 480 of an example operation of the information cleaning process, in accordance with an example embodiment of the invention.

At the time point of t3, i.e., the timeout event of a cooling window timer in step 482, the node will enter an information cleaning process, as shown in FIG. 4C.

All the records containing the msg_id will be removed from Relaying Database in step 484, so as to release storage space.

The process ends at step 486.

Figure 5:
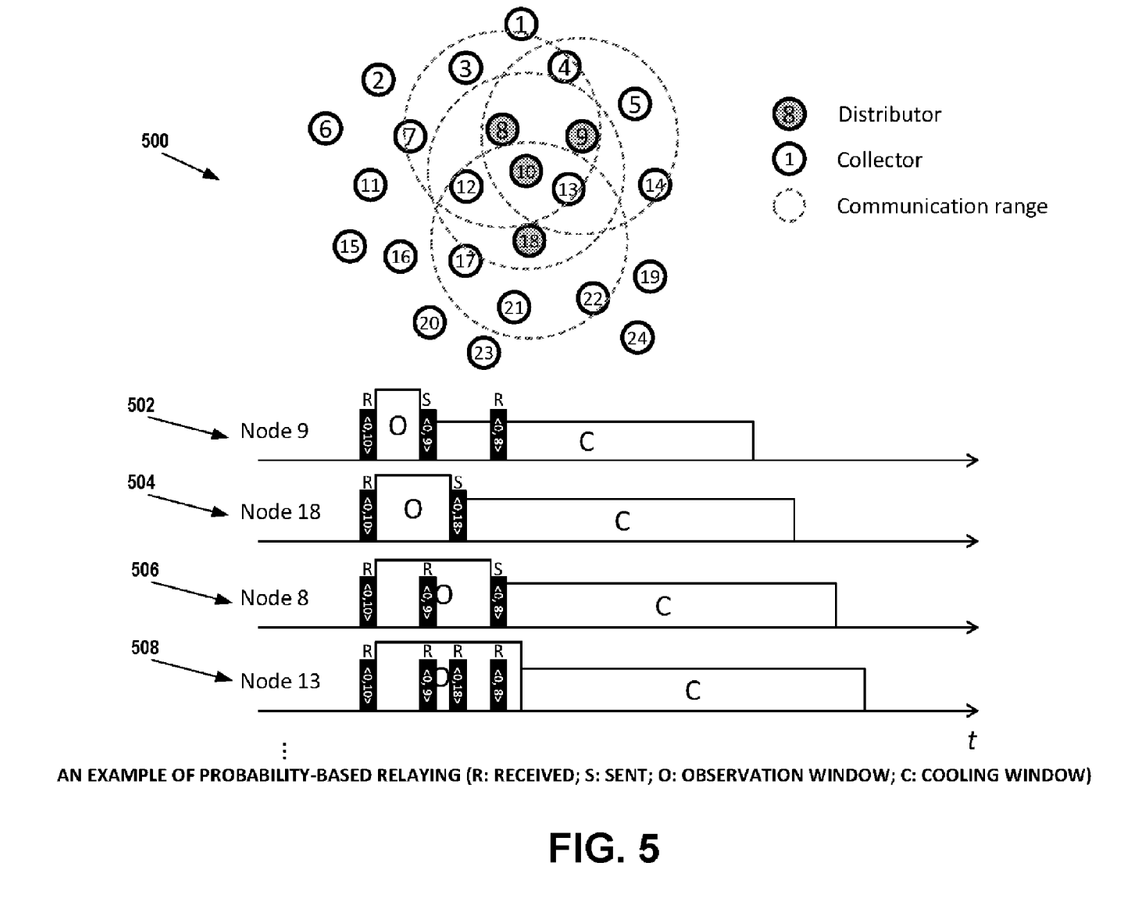
FIG. 5 illustrates an example probability-based relaying (R: Received; S: Sent; O: Observation window; C: Cooling window), in accordance with an example embodiment of the invention.

FIG. 5 illustrates an example probability-based relaying (R: Received; S: Sent; O: Observation window; C: Cooling window), in accordance with an example embodiment of the invention. To better understand the working principle of the probability-based relaying solution, FIG. 5 presents an example depicting what is happening during the course of data distribution from the perspective of the whole network 500. Here we assume that a message may be carried by a single packet.

After a source, say node 10, initiates the data distribution, nodes within its communication range (8, 9, 12, 13, and 18) receive the message (msg_id=0). These nodes soon set up observation windows "O" with random lengths, which are enumerated in an ascending order in the figure's lower part.

The node with the shortest length of observation window "O", say node 9 in time line 502, observes only distributor 10 and thus has the probability of 1 (M=1, P=1/M=1) becoming the relaying distributor.

The node with the second shortest length, say node 18 in time line 504, as not observing distributor 9 due to its location, has the probability of 1 (M=1, P=1) becoming the relaying distributor.

The node with third shortest length, say node 8 in time line 506, observing the distributor 10 and the relaying distributor of 9, has the probability of ½(M=2, P=1/2) becoming the relaying distributor (assumedly it then turns to a distributor in this case).

The fourth node, say Node 13 in time line 508, observing node 10, 9, 18 and 8 due to its location, has a relative low probability of ¼(M=4, P=1/4) consequently, and thus does not become a distributor.

It may be seen that the probability for a node to become a distributor has a reverse relationship with the density of its nearby distributors. In addition, as seen in the figure, the relaying message sent by distributor 8 is received in the cooling window "C" of distributor 9, thus is treated as a known message and should be dropped (refer to FIG. 4A). Therefore, the cooling window "C" may effectively prevent the other distributors' broadcasting messages from being relaying again.

FIG. 6 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   receiving a wireless broadcast message including a message ID and an associated distributor address;
   buffering the received wireless broadcast message and starting an observation window timer for the message if the message ID of the received wireless broadcast message is not stored in a database of message IDs and associated distributor addresses for previously received wireless broadcast messages;
   calculating a relaying probability for the received wireless broadcast message, based on a number of distributor address entries associated with the message ID in the database, the entries resulting from receiving other wireless broadcast messages having the same message ID during the observation window;
   transmitting the buffered message following termination of the observation window, based on the calculated relaying probability; and
   starting a cooling window timer upon termination of the observation window and removing all records containing the message ID from the database following termination of the cooling window;
   wherein the database comprises message IDs and associated distributor addresses for previously received wireless broadcast messages.

2. The method of claim 1, further comprising:
   scheduling the transmitting the received wireless broadcast message, if the relaying probability is not less than a random number.

3. The method of claim 1, further comprising:
   calculating the relaying probability based on the number of distributor address entries associated with the message ID in the database and a value derived from measured signal strengths of the received wireless broadcast messages; and
   scheduling the transmitting the received wireless broadcast message, if the relaying probability is not less than a random number.

4. The method of claim 1, wherein the observation window has a random duration.

5. The method of claim 1, wherein the cooling window is at least twice a duration of the observation window.

6. The method of claim 1, further comprising:
   ignoring any further wireless broadcast messages having the message ID during the cooling window.

7. An apparatus, comprising:
   at least one processor;
   at least one memory including computer program code;
   the at least one memory and the computer program code configured to, with the at least one processor, cause the apparatus at least to:
   receive a wireless broadcast message including a message ID and an associated distributor address;
   buffer the received wireless broadcast message and start an observation window timer for the message if the message ID of the received wireless broadcast message is not stored in a database of message IDs and associated distributor addresses for previously received wireless broadcast messages;
   calculate a relaying probability for the received wireless broadcast message, based on a number of distributor address entries associated with the message ID in the database, the entries resulting from receiving other wireless broadcast messages having the same message ID during the observation window;
   transmit the buffered message following termination of the observation window, based on the calculated relaying probability;
   and start a cooling window timer upon termination of the observation window and remove all records containing the message ID from the database following termination of the cooling window;
   wherein the database comprises message IDs and associated distributor addresses for previously received wireless broadcast messages.

8. The apparatus of claim 7, further comprising:
   the at least one memory and the computer program code configured to, with the at least one processor, cause the apparatus at least to:
   schedule the transmitting the received wireless broadcast message, if the relaying probability is not less than a random number.

9. The apparatus of claim 7, further comprising:
   the at least one memory and the computer program code configured to, with the at least one processor, cause the apparatus at least to:
   calculate the relaying probability based on the number of distributor address entries associated with the message ID in the database and a value derived from measured signal strengths of the received wireless broadcast messages; and
   schedule the transmitting the received wireless broadcast message, if the relaying probability is not less than a random number.

10. The apparatus of claim 7, wherein the observation window has a random duration.

11. The apparatus of claim 7, wherein the cooling window is at least twice a duration of the observation window.

12. The apparatus of claim 7, further comprising:
    the at least one memory and the computer program code configured to, with the at least one processor, cause the apparatus at least to:
    ignore any further wireless broadcast messages having the same message ID during the cooling window.

13. A computer program product comprising computer executable program code recorded on a computer readable non-transitory storage medium, the computer executable program code comprising:
    code for receiving a wireless broadcast message including a message ID and an associated distributor address;
    code for buffering the received wireless broadcast message and starting an observation window timer for the message if the message ID of the received wireless broadcast message is not stored in a database of message IDs and associated distributor addresses for previously received wireless broadcast messages;
    code for calculating a relaying probability for the received wireless broadcast message, based on a number of distributor address entries associated with the message ID in the database, the entries resulting from receiving other wireless broadcast messages having the same message ID during the observation window;
    code for transmitting the buffered message following termination of the observation window, based on the calculated relaying probability;

and code for starting a cooling window timer upon termination of the observation window and removing all records containing the message ID from the database following termination of the cooling window;

wherein the database comprises message IDs and associated distributor addresses for previously received wireless broadcast messages.

14. The computer program product of claim 13, further comprising:

code for scheduling the transmitting the received wireless broadcast message, if the relaying probability is not less than a random number.

15. The computer program product of claim 13, further comprising:

code for calculating the relaying probability based on the number of distributor address entries associated with the message ID in the database and a value derived from measured signal strengths of the received wireless broadcast messages; and code for scheduling the transmitting the received wireless broadcast message, if the relaying probability is not less than a random number.

16. The computer program product of claim 13, wherein the observation window has a random duration.

17. The computer program product of claim 13, wherein the cooling window is at least twice a duration of the observation window.

18. The computer program product of claim 13, further comprising:

code for ignoring any further wireless broadcast messages having the same message ID during the cooling window.

\* \* \* \* \*